United States Patent [19]

Stumpe

[11] Patent Number: 4,568,129
[45] Date of Patent: Feb. 4, 1986

[54] BRAKE SYSTEM FOR VEHICLES WITH TRAILERS

[75] Inventor: Werner Stumpe, Kornwestheim, Fed. Rep. of Germany

[73] Assignee: Robert Bosch GmbH, Stuttgart, Fed. Rep. of Germany

[21] Appl. No.: 443,713

[22] Filed: Nov. 22, 1982

[30] Foreign Application Priority Data

Mar. 4, 1982 [DE] Fed. Rep. of Germany ....... 3207793

[51] Int. Cl.⁴ .......................... B60T 8/02; B60T 13/66
[52] U.S. Cl. .......................................... 303/7; 303/15; 303/22 R; 303/100
[58] Field of Search ....................... 303/7, 3, 2, 15, 13, 303/8, 100, 119, 91, 92, 93, 22 R, 28–30, 20, 48, 50–56, 6 A, 6 R, 9, 14, 84 A, 84 R, 25–27; 188/3 R, 195, 181 A, 181 R, 112

[56] References Cited

U.S. PATENT DOCUMENTS

| | | | |
|---|---|---|---|
| 3,041,114 | 6/1962 | Stelzer | 303/7 |
| 3,168,352 | 2/1965 | Stelzer | 303/7 |
| 3,507,542 | 4/1970 | Cannella | 303/7 |
| 3,545,815 | 12/1970 | Berg | 303/7 |
| 4,049,324 | 9/1977 | Cermak | 303/7 |
| 4,291,924 | 9/1981 | Leiber et al. | 303/111 |

FOREIGN PATENT DOCUMENTS 1039857 9/1958 Fed. Rep. of Germany .

Primary Examiner—Douglas C. Butler
Attorney, Agent, or Firm—Edwin E. Greigg

[57] ABSTRACT

A brake system for vehicles with trailers and having a compressed-air, dual-line brake system, in which a pressure sensor is associated with the trailer brake valve, with which sensor an electronic switching system disposed on the trailer can be triggered. A following pressure control valve is either switched parallel to a brake line leading from the trailer brake valve to the brake cylinders or, given dual-circuit triggering, of itself takes on the function of supplying the brake cylinders.

10 Claims, 3 Drawing Figures

BRAKE SYSTEM FOR VEHICLES WITH TRAILERS

BACKGROUND OF THE INVENTION

The invention is based on a brake system for vehicles with trailers as defined hereinafter. A brake system of this kind is known from German Pat. No. 1 039 857.

In known brake systems of this kind, the lines leading to the brake cylinders for the trailers are quite long, causing a great deal of time to be lost before the trailer brakes respond. This condition applies as well to the relay-like actuation of the brakes via the trailer brake valve, because this valve disposed on the trailer must first be triggered by the brake pressure in the vehicle towing the trailer. A further requirement is that the trailer brakes should respond earlier than those of the towing vehicle, so that the vehicle and trailer remain spaced properly apart and do not jackknife or run into one another.

OBJECT AND SUMMARY OF THE INVENTION

The brake system for vehicles with trailers having the characteristics described hereinafter has the advantage over the prior art in that braking is rapidly effected at the trailer without any time loss. As a result, the advanced braking of the trailer brake which is required for keeping the vehicle and trailer properly apart can easily be assured.

It is a further advantage that the pressure sensor used in the invention is a conventional switching element. It is furthermore advantageous in this respect that the function of the electronic switching system can be taken over by an anti-skid brake system.

Finally, it is also advantageous that the brake system is embodied in part as a dual-circuit system, so that a defect of one control circuit cannot cause brake failure.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
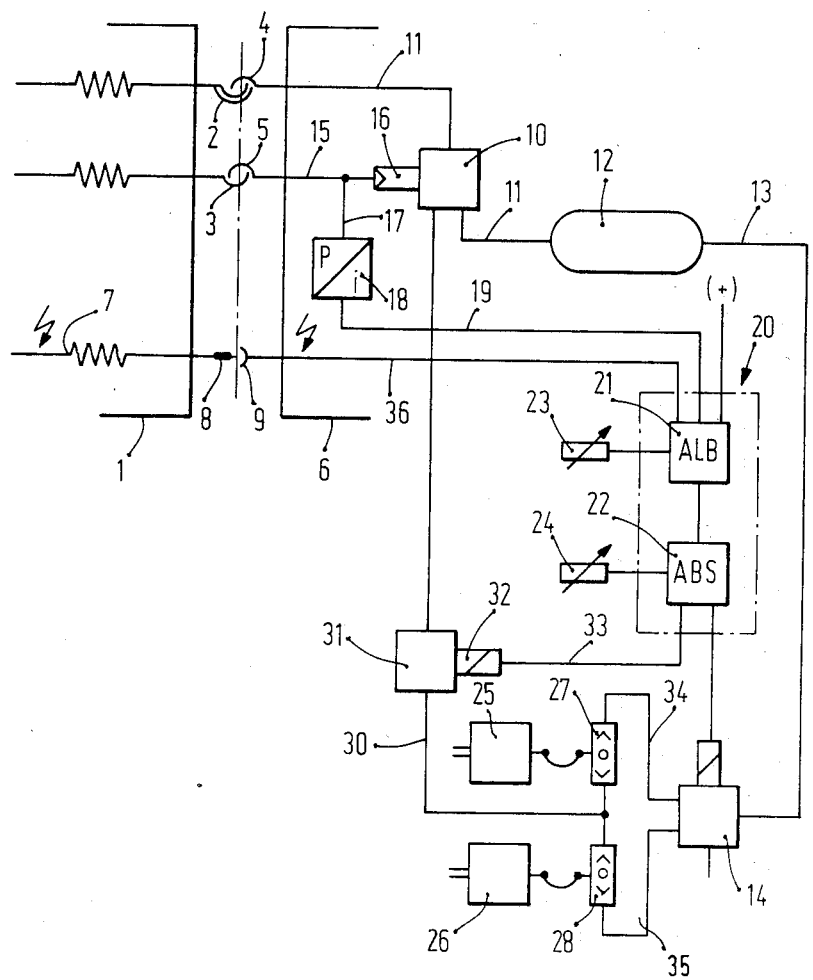
FIG. 1 shows a first exemplary embodiment of the brake system according to the invention which includes an electrical control for the trailer brakes.

A supply line coupler head 2 and a brake line coupler head 3 are disposed on the end of a pressure towing vehicle 1 and can be coupled with corresponding counterpart coupling heads 4 and 5 provided on a trailer 6. The brake system for vehicles with trailers is accordingly a dual-circuit brake system.

Figure 3:
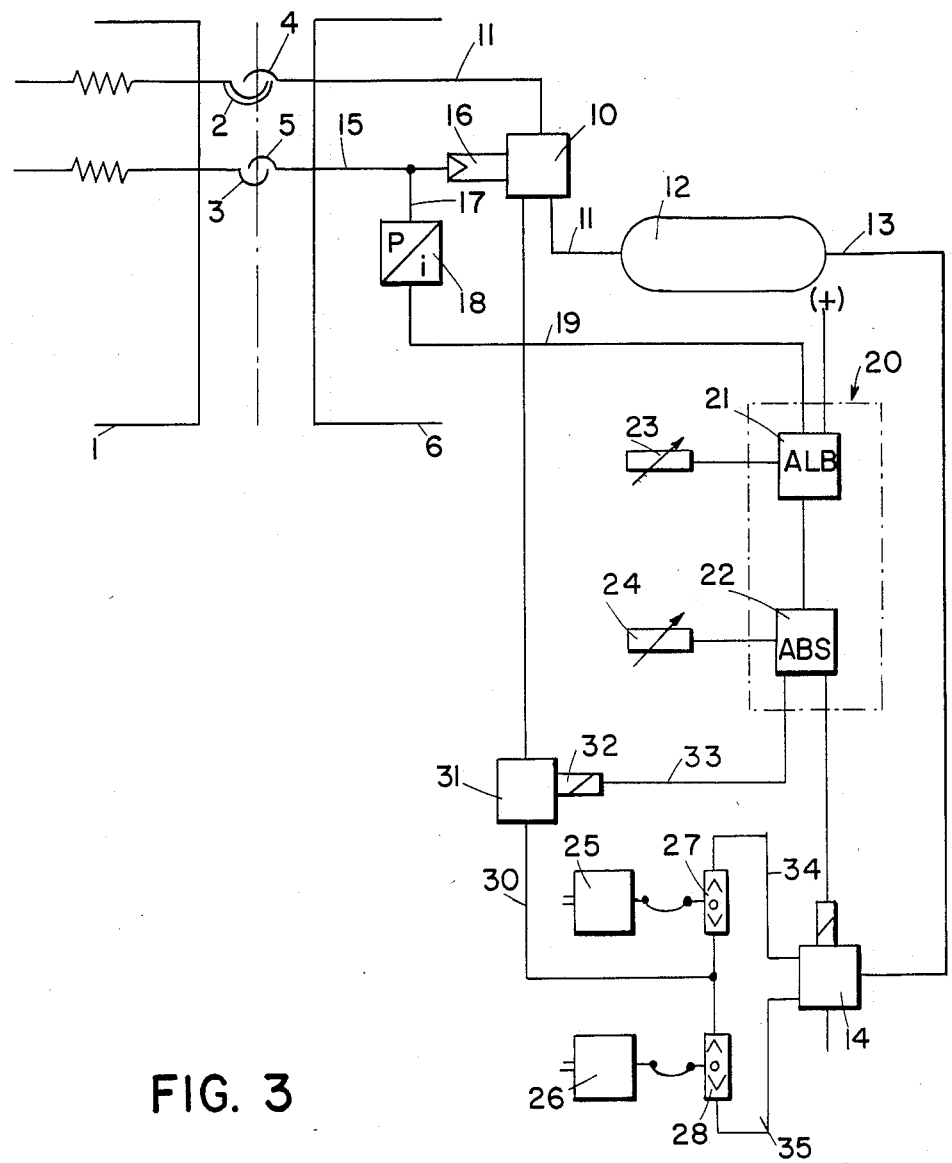
FIG. 3 shows a second embodiment of the brake system according to the invention which system does not include an electrical control from the towing vehicle for the trailer brakes.

The towing vehicle 1 may either be embodied without an electrical line 7 as shown in FIG. 3 or, it may have a supplementary electrical control line 7 as shown in FIG. 1, by way of which a braking signal can be transmitted to the trailer, originating for instance at the brake pedal of the towing vehicle. A corresponding line coupling is indicated by reference numerals 8 and 9.

A pressure controlled trailer brake valve 10 is disposed on the trailer 6, and a supply line 11 lead via this brake valve 10 to a supply container 12 and thence via a further supply line 13 to an electromagnetically controlled pressure control valve 14.

From the counterpart coupling head 5, a trailer brake line 15 leads to a control connection 16 of the trailer brake valve 10. A branch line 17 leading to a pressure sensor 18 branches off from this trailer brake line 15. From the pressure sensor 18, an electrical line 19 leads to an electronic switching system 20, which either corresponds to or is at least similar to an anti-skid brake system of known design, such as shown in U.S. Pat. No. 4,291,924.

A load-dependent control member 21 and a wheel-rpm-dependent control member 22 are provided in this electronic switching system 20, and they can be provided with signals via corresponding sensors 23 and 24; these signals are evaluated in the electronic switching system 20. The switching system 20 is followed by the electromagnetic controlled pressure control valve 14, which is triggerable with signals from the switching system 20 in order to control fluid flow from supply container 12 via line 13 to lines 34 and 35 which are connected to one end of check valves 27 and 28.

Two brake cylinders 25 and 26 are furthermore disposed on the trailer 6, each cylinder being preceded by a two-way check valve 27 and 28, respectively. One end of each check valve 27 and 28 is connected via respective brake lines 34 and 35 to the elastically controlled pressure control valve 14 which is connected to the supply container 12 via fluid line 13.

The other end of the check valves 27 and 28 is connected with a brake line 30, which originates at the trailer brake valve 10. A normally open 3/2-way blocking valve 31 is inserted into this brake line 30, and the magnet 32 of this blocking valve 31 is triggerable via an electrical signal over line 33 from the electronic control system 20 in order to close brake line 30 and to release the brakes due to an anti-skid situation.

FIG. 3 illustrates a braking system which does not include the electrical control which is made available over line 7, connectors 8 and 9, and line 36, as shown in FIG. 1.

MODE OF OPERATION

The trailer supply container 12 is filled with air via the supply line 11. Upon braking, the brake pressure is exerted via the brake line 15 at the pressure control connection 16 of the trailer brake valve 10, and this valve 10 then directs a proportional brake pressure via normally open blocking valve 31 and the brake line 30 to the brake cylinders 25 and 26.

The pressure in the trailer brake line 15, via the branch line 17, also reaches the pressure sensor 18, and this sensor then forms a corresponding electrical signal and emits it via the line 19 to the switching system 20. This signal is linked in the electronic switching system 20 with the signals of the sensors 23 and 24, and a regulating signal is then supplied to the pressure control valve 14. Either in a clocked manner or proportionally, depending upon its embodiment, the pressure control valve 14 directs supply pressure out of the supply container 12 via the brake lines 34 and 35 to the two-way check valves 27 and 28. The rapid switching of the electrical system assures that no pressure is yet present at the outer ends of the two-way check valves 27 and 28. As a result, the pressure can flow from the pressure control valve 14 directly to the brake cylinders 25 and 26; thus braking occurs. Trailing behind the electrical control signal, a brake pressure which requires a longer period of time to build up than an electrical signal then likewise flows from the trailer brake valve 10 via the normally open blocking valve 31 and the brake line 30 to the two-way check valves 27 and 28; however, this brake pressure is no longer effective because the supply pressure from the supply container via pressure control valve 14, and lines 34, 35 to the check valves 27, 28 reaches the end of the check valves before the fluid pressure over line 30 reaches the ends of the check valves 27 and 28.

Only when no pressure exists on the side of the pressure control valve 14 do the two-way check valves 27 and 28 switch over and permit the brake pressure to flow from the brake line 30 to the brake cylinders 25 and 26. The dual-circuit nature of the system is thereby assured.

The 3/2-way magnetic valve 31 has the task of enabling relief of the brake line 30 whenever the anti-skid brake system is functioning. That is, when a signal is directed to the electromagnetic control 32 from control member 22, the control valve 31 is closed and the pressure to the valves 27 and 28 is relieved.

If the towing vehicle 1 has an electrical control line 7, as indicated FIG. 1, then a signal corresponding to the actuation of the towing-vehicle brake is delivered via an electrical line 36 directly to the electronic switching system 20.

Figure 2:
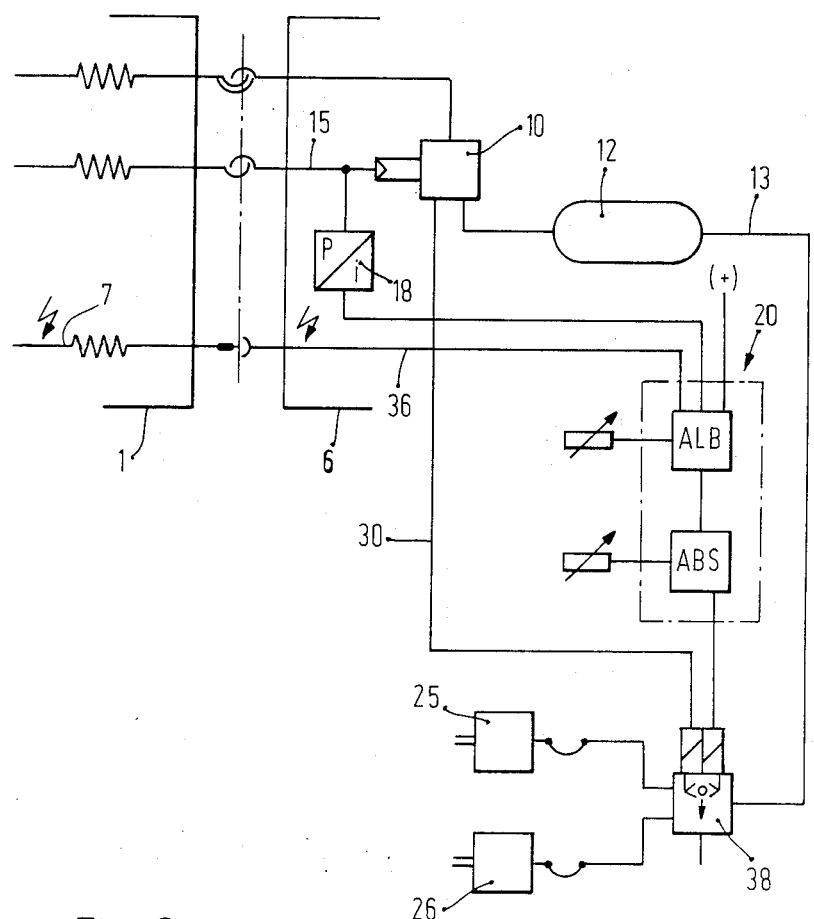
FIG. 2 shows a simplified variant of the embodiment of FIG. 1.

The simplified embodiment shown in FIG. 2 has similar elements corresponding to those of FIG. 1, which accordingly are provided with identical reference numerals. However, in this second embodiment a pressure control valve 38 is used, which is triggerable not only electrically by the electronic switching system 20 but also pneumatically by the pressure in the brake line 30. For selecting either of these trigger signals an OR gating device 39 not shown in further detail is integrated into the pressure control valve 38 in a well known manner so that this valve can then select the stronger or faster signal directly, in order to trigger the brake cylinders 25 and 27.

The foregoing relates to preferred exemlary embodiments of the invention, it being understood that other embodiments and variants thereof are possible within the spirit and scope of the invention, the latter being defined by the appended claims.

What is claimed and desired to be secured by Letters Patent of the United States is:

1. A brake system for a towing vehicle with a trailer having trailer brake cylinders, a compressed-air supply line and a pressure brake control line on said towing vehicle interconnected by respective compressed-air line couplings to a compressed air supply line and a brake control line on said trailer, a trailer brake control valve connected to said brake control line for controlling fluid flow from said compressed air supply line to a compressed air supply container and from said compressed air supply line to said brake cylinders, and electrical control elements on said trailer for controlling fluid flow to said brake cylinders, the improvement comprising a pressure sensor means connected to said brake control line subjected to pressure in said brake control line disposed on said trailer, said pressure sensor means having an electrical output electrically connected by a first electrical line to an electronic switching system, said electronic switching system including a load dependent control member and a wheel-rpm-dependent switching system, said electronic switching system having at least one electrical output, supply fluid pressure control valve means, said supply fluid pressure control valve means includes an electro-magnetically operated control means connected electrically to an output of said electronic switching system and controlled thereby for supplying compressed air from said compressed air supply container to said trailer brake cylinders connected to said pressure control valve means.

2. A brake system for a vehicle with a trailer as defined by claim 1, in which a first brake line is connected from said trailer brake control valve to said brake cylinders and further comprising a normally open 3/2-way blocking valve disposed in said first brake line between said trailer brake control valve and said brake cylinders, a second brake line leading from said 3/2-way blocking valve and connected to a two-way check valve for each said brake cylinders, and a third and fourth brake line leading from said electro-magnetically operated pressure control valve and connected to one of said two-way check valves.

3. A brake system for a vehicle with a trailer as defined by claim 2, wherein said 3/2-way blocking valve is a magnetic valve having a magnet triggerable by said electronic switching system.

4. A brake system for a vehicle with a trailer as defined by claim 1, further comprising a second electrical line connected to said electronic switching means and to an electrical line on said towing vehicle which is supplied with a control current corresponding to a brake pressure applied thereto on said towing vehicle.

5. A brake system for a vehicle with a trailer as defined by claim 4, wherein said electronic switching means is supplied with signals from at least one load sensor and with signals from at least one wheel rpm sensor.

6. A brake system for a vehicle with a trailer as defined by claim 4, in which a first brake line is connected from said trailer brake control valve to said brake cylinders and further comprising a normally open 3/2-way blocking valve disposed in said first brake line between said trailer brake control valve and said brake cylinders, a second brake line leading from said 3/2-way blocking valve and connected to a two-way check valve for each said brake cylinders, and a third and fourth brake line leading from said electro-magnetically operated pressure control valve and connected to one of said two-way check valves.

7. A brake system for a vehicle with a trailer as defined by claim 6, wherein said 3/2-way blocking valve is a magnetic valve having a magnet triggerable by said electronic switching system.

8. A brake system for a vehicle with a trailer as defined by claim 1, wherein said electronic switching means is supplied with signals from at least one load sensor and with signals from at least one wheel rpm sensor.

9. A brake system for a towing vehicle with a trailer as claimed in claim 1 wherein said supply fluid pressure control valve means also includes a pressure control means connected to a fluid supply line connected from said trailer brake control valve to said pressure control means, wherein said supply fluid pressure control valve means is controllable by a trigger signal from said electronic switching means as well as by a trigger signal from said trailer brake control valve.

10. A brake system for a vehicle with a trailer as defined by claim 9, wherein an OR gate is provided in the pressure control valve for gating the stronger of the two trigger signals provided at a given time by said electronic switching means and said trailer brake valve.

* * * * *